April 18, 1933.　　S. R. MERLEY ET AL　　1,904,160
MANUFACTURE OF ACETIC ACID
Filed Jan. 31, 1931
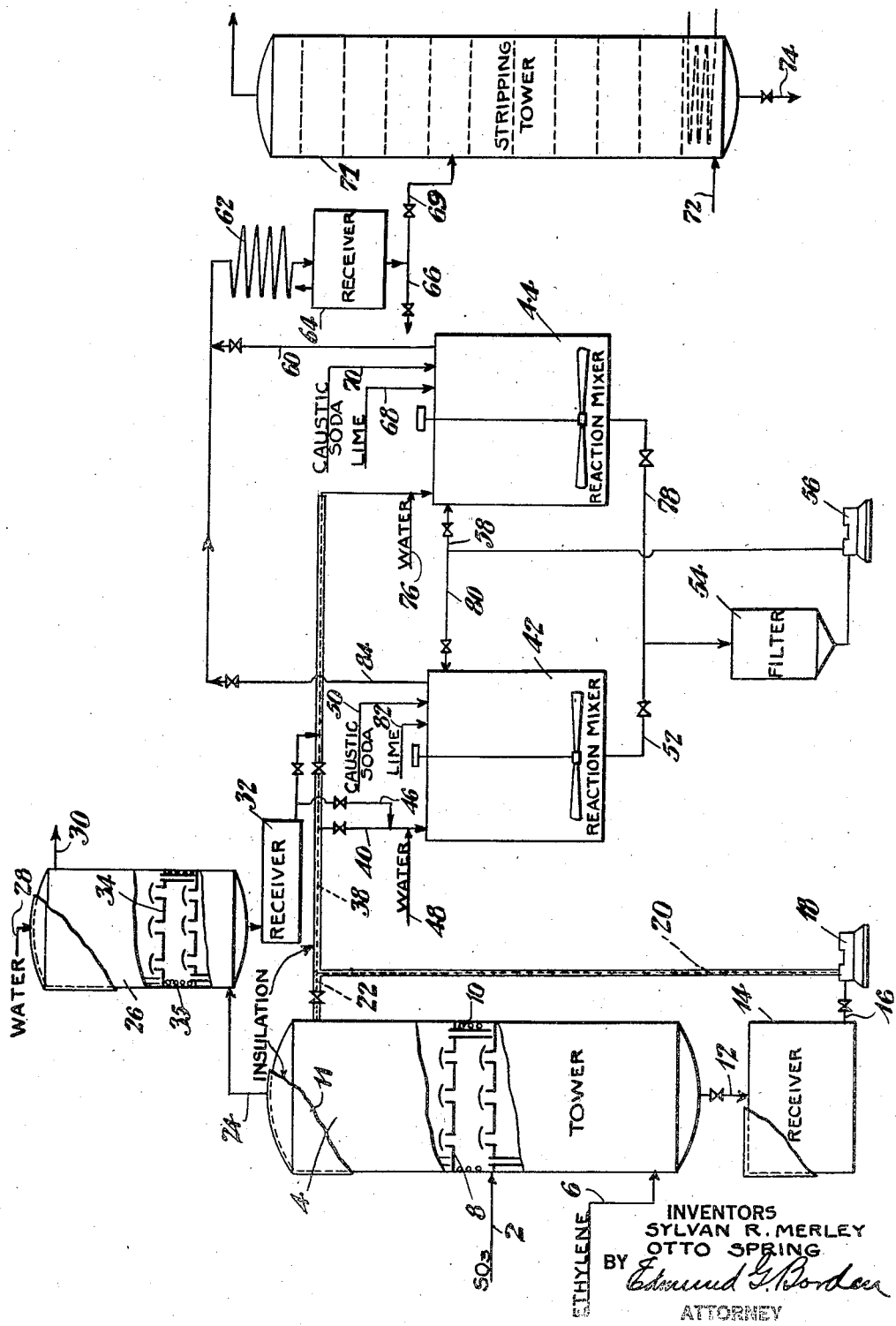
INVENTORS
SYLVAN R. MERLEY
OTTO SPRING
BY
ATTORNEY Patented Apr. 18, 1933

1,904,160

UNITED STATES PATENT OFFICE

SYLVAN R. MERLEY, OF DOVER, NEW JERSEY, AND OTTO SPRING, OF OKMULGEE, OKLAHOMA, ASSIGNORS TO DOHERTY RESEARCH COMPANY, OF NEW YORK, N. Y., A CORPORATION OF DELAWARE

MANUFACTURE OF ACETIC ACID

Application filed January 31, 1931. Serial No. 512,563.

This invention relates to a process for manufacturing acetic acid from carbyl sulfate.

Acetic acid is commonly manufactured by the interaction of anhydrous calcium acetate and concentrated sulfuric acid with subsequent distillation of the acetic acid resulting from the reaction. In such a process however it has been found that the use of concentrated sulfuric acid causes the formation of sulfur dioxide and other decomposition products, while there is insufficient water present in the mixture to form acetic acid. Furthermore the concentrated acid dehydrates the acetic acid to form acetic anhydride and other compounds which materially decrease the yield of acetic acid. Furthermore, the calcium acetate generally employed in this process contains considerable quantities of tars and other impurities which contaminate the final product and impair the purity of the acetic acid as recovered.

The primary object therefore of the present invention is to provide a process for the manufacture of acetic acid by which substantially pure acetic acid will be produced in a satisfactory manner.

A further object of the invention is to avoid the difficulties which have been experienced in the manufacture of acetic acid by present methods.

With these objects in view, the process of the present invention comprises the production of carbyl sulfate by the interaction of ethylene and sulfur trioxide at a temperature of about 95 to 115° C., the hydrolysis of the resulting carbyl sulfate to obtain a mixture of sulfuric acid and isethionic acid, which mixture is used as a starting material for making the acetic acid in accordance with the present invention. The sulfuric acid, isethionic acid mixture is first neutralized with caustic soda and a solution containing sodium sulfate and sodium isethionate is obtained from which the sodium sulfate is separated by filtration from the solution. The filtrate, substantially free of sodium sulfate, is concentrated to about half its initial volume and finally heated to a temperature of about 155° C. after which a small proportion of commercial lime to prevent foaming and sodium hydroxide are added to the mixture with constant stirring. The mixture now is strongly alkaline and contains the desired sodium acetate which is converted to acetic acid by mixing the solution with the necessary quantity of the sulfuric acid-isethionic acid mixture to be used for the next batch. The acetic acid is separated from the resulting mixture by distillation or extraction and the residue is subjected to the same treatment as the initial acid mixture.

With the above objects in view and a general outline of the invention in mind, the details of the process will now be described in connection with the accompanying drawing, in which:

The figure is a flow diagram of the process.

Referring to the figure of the drawing, sulfur trioxide in vapor or liquid phase is conducted under pressure through inlet 2 into the upper portion of a reaction tower 4. As the sulfur trioxide because of its high specific gravity diffuses throughout the tower, ethylene or tail gas containing ethylene obtained in the cracking of petroleum, is conducted under pressure through an inlet 6 into the lower portion of the tower 4 to combine with the sulfur trioxide thereby forming carbyl sulfate.

The reaction between the sulfur trioxide and ethylene in the tower is controlled so as to maintain the desired temperature. The tower is of ordinary construction being provided with bubble cap tray sections 8 and coils 10 through which a hot brine solution at temperatures between 95 to 115° C., is circulated to aid the reaction and at the same time to temper the reaction between the sulfur trioxide and ethylene. The hot brine, while maintaining the temperature in the tower to keep the carbyl sulfate in molten condition, is also adapted to take up heat and thereby prevent overheating or carbonization of the carbyl sulfate formed. The tower is preferably covered with insulating material 11, to reduce to a minimum the radiation heat loss from the tower.

As liquid carbyl sulfate is formed, it flows downwardly over the tower trays counter current to both gases introduced into the tower, thus bringing them into intimate contact to produce larger yields of carbyl sulfate. The carbyl sulfate is withdrawn from the tower through a valved conduit 12 into an insulated receiving tank 14. The carbyl sulfate has a melting point of about 80° C., and in order to keep it above its melting point and in liquid phase the pipe lines conducting it are well insulated. As soon as a sufficient quantity of carbyl sulfate has collected in the tank 14 it is withdrawn through a valve controlled pipe 16 and passed by a pump 18 and insulated pipes 20 and 22 into the upper portion of the tower in which the sulfate acts to maintain intimate contact between the gases therein.

If pure ethylene has been introduced into the tower there will be no spent gases escaping from the top of the tower since the combination between the sulfur trioxide and the ethylene is practically quantitative. However, if tail gases containing ethylene obtained in the cracking of petroleum are introduced into the tower, the spent gases escaping overhead will mechanically carry off carbyl sulfate. The tail gases therefore, leaving the tower 4 are conducted through a vapor line 24 into a scrubber 26 in which they pass countercurrent to water introduced through a pipe 28. The washed gases pass off through an outlet 30. The water, preferably hot, hydrolyzes whatever carbyl sulfate is caried over with the gases, to form a solution of isethionic and sulfuric acids which is withdrawn into a receiver tank 32. If any ethylene oxide is formed in tower 4, it would react with sulfur trioxide to form glycol sulfate, a heavy non-volatile liquid which is recovered in the carbyl sulfate solution. From this the glycol sulfate would be converted to ethylene oxide or glycol when treated with caustic in the reaction mixer 42, the ethylene oxide or glycol being vented overhead.

The scrubbing tower may be similar in construction to tower 4 being provided with bubble cap trays 34 and coils 35 through which a cooling or heating medium may be circulated to control the temperature during the hydrolysis of the carbyl sulfate. The scrubber is also insulated to prevent heat loss by radiation. A hot brine solution at temperatures of 95 to 115° C. passing through the coils has been found best to control the reaction during the hydrolysis of the carbyl sulfate.

When a sufficient accumulation of carbyl sulfate has been made in receiver 14, a batch of this material is conducted from pipe 20 through pipe 38 and branch pipe 40 into a reaction mixing chamber 42. The mixer 42 is one of a pair of mixers 42 and 44 which are provided with the usual mixing blades and also with a jacket so that they may be either heated or cooled in accordance with the desire of the operator or the necessity for the particular reaction. To the batch of carbyl sulfate in mixer 42 may be added the accumulation of dilute sulfuric acid and isethionic acid collected in receiver 32, through a valved pipe 46. In order to completely hydrolyze the carbyl sulfate in the reaction mixers additional quantities of water are introduced through pipe 48. The resultant mixture in chamber 42 comprises sulfuric acid and isethionic acid.

This mixture is next neutralized with a caustic soda solution which is introduced into chamber 42 through a pipe 50. In neutralizing the mixture considerable quantities of sodium sulfate are formed in addition to sodium isethionate. The solution is then concentrated and cooled to crystallize the sodium sulfate. The mixture containing sodium sulfate is conducted through a valved pipe 52 and a filter 54 where the sodium sulfate is separated and removed from the sodium isethionate which remains in solution and is pumped by means of a pump 56 and valved pipe 58 into the second reaction chamber 44. In the reaction chamber 44 the mixture is concentrated to about half its original volume by applying heat to the jacket of the mixer. The vapors formed in this concentration are conducted through a valved pipe line 60, through a condenser 62 and the condensate conducted into a receiver 64. The water collecting in receiver 64 may be discharged through a valved outlet 66. As the mixture in tank 44 reaches the proper concentration, it is raised to a temperature of about 155° C. at which time a quantity of ordinary commercial lime (calcium oxide) is added through conduit 68 and an excess of caustic soda solution is added through conduit 70.

The addition of concentrated caustic soda to the sodium isethionate causes the conversion of the latter into sodium acetate.

During the treatment of the mixture in chamber 44 a second batch of carbyl sulfate has been hydrolyzed in chamber 42 and is now conducted through pipes 52 and 58 into chamber 44, in which it is used to neutralize the reaction mixture therein. In fact sufficient quantities of the acid mixture are introduced to make the mixture in chamber 44 acid and thereby convert the sodium acetate into acetic acid.

The acetic acid in chamber 44 is preferably removed by distillation, the vapors being conducted through vapor line 60 and condensed in condenser 62. In this distillation substantial quantities of water, as well as sulphur dioxide are removed and conducted over with the acetic acid. The condensed acetic acid and water mixture is collected in receiver 64 while the gas is vented. In order to more effectively remove any absorbed sulfur dioxide from the acetic acid mixture, the latter is conducted through a valved pipe 69 into a stripping tower 71 in which the liquid flows down over a series of trays countercurrent to an inert gas, such as air or carbon dioxide, introduced through a pipe 72. The lower portion of the tower 71 may be maintained at a temperature such that no substantial amount of the sulfur dioxide will remain dissolved in the acetic acid mixture, but at a temperature below the boiling point of the acetic acid. The purified acetic acid is withdrawn to storage through a valved pipe 74.

The mixture remaining in the reaction chamber 44 now comprises a more or less concentrated residue of sulfuric acid and isethionic acid, which is neutralized by introducing a caustic soda solution through a pipe 70. The sodium sulfate and sodium isethionate solution produced by neutralization is concentrated to crystallize the sodium sulfate which is filtered off by conducting the reaction mixture through a valved pipe 78 and filter 54, the filtrate containing sodium isethionate being conducted by pump 56 and a valved pipe 80 into the first mixer 42, where the steps of the process are repeated on the sodium isethionate.

In treating the solution in the mixer, lime may be added through conduit 82 and the vapors conducted from the chamber during the distillations through valved vapor line 84 which connects with condenser 62.

From the above description, it is evident that the process included by the present invention is capable of converting relatively inexpensive ethylene contained in cracking still gases into a relatively more valuable product by the use of ordinary chemicals such as sulfur trioxide and alkalies. An important feature of the process also includes the use of the acid solution produced in one operation for neutralizing and converting sodium acetate produced in another step of the process into acetic acid. These features greatly lessen the expense involved in the manufacture of acetic acid.

In describing the process of the present invention two reaction chambers were referred to, but it is to be understood that additional chambers may be used and at the same time maintain the series of operations outlined.

In the present process, the quantity of sulfur trioxide contacted with ethylene is only such that there never is any free sulfur trioxide carried overhead from the reaction tower.

It is understood that the acetic acid resulting from the acidification of the alkaline mixture containing an acetate may be separated from the resultant mixture in any manner other than that described herein without departing from the scope of the invention.

Having thus described the invention in its preferred form what is claimed as new is:

1. The process of making acetic acid, which comprises contacting ethylene with sulfur trioxide in a contact zone, collecting the resultant carbyl sulfate from the bottom of said zone and recycling the same through said zone, cooling and hydrolyzing carbyl sulfate from said zone, neutralizing the hydrolyzed solution with caustic soda, crystallizing the sodium sulfate in the neutralized solution, filtering the solution free of precipitated sodium sulfate, heating and concentrating the filtrate, adding lime and an excess of a solution of caustic soda to the mixture while vigorously stirring the same, adding a solution containing a mixture of isethionic and sulfuric acid to the mixture to acidify the same, distilling off the resulting acetic acid and collecting the condensed acetic acid.

2. The process of manufacturing acetic acid, which comprises contacting sulfur trioxide with cracked petroleum vapors containing ethylene to form carbyl sulfate, collecting the same and recycling it through said contact zone, withdrawing part of the collected carbyl sulfate, cooling and hydrolyzing with hot water to form a mixture containing isethionic and sulfuric acids, neutralizing said acids with caustic soda, crystallizing and filtering off the sodium sulfate from said solution, concentrating the filtrate containing sodium isethionate, raising the temperature of the filtrate to about 150° C., adding lime and an excess of a solution of caustic soda with constant stirring to form an alkaline solution containing sodium acetate, acidifying to produce a mixture containing acetic acid, and then distilling over the acetic acid from the mixture.

3. The process of manufacturing acetic acid, which comprises, hydrolyzing carbyl sulfate with sufficient water to form a mixture containing isethionic and sulfuric acids while controlling the heat of reaction resulting from the hydrolysis, neutralizing said mixture with a caustic soda solution to form a mixture containing sodium sulfate and sodium isethionate, cooling the mixture to crystallize therefrom the sodium sulfate, filtering off the crystalline sulfate, collecting the filtrate and concentrating it to about one half of its original volume, raising the temperature of the concentrate to about 155° C., adding a small quantity of lime, then an excess of a solution of caustic soda to said concentrate with constant stirring, reducing the temperature on the resultant mixture to about 120° C., acidifying the mixture with a solution containing isethionic and sulfuric acids, then taking off the resultant acetic acid from the mixture.

4. The process of manufacturing acetic acid, which comprises hydrolyzing carbyl sulfate to form a mixture containing isethionic and sulfuric acids, neutralizing said mixture to form sodium isethionate and sodium sulfate, concentrating and cooling the mixture to crystallize out the sodium sulfate from said mixture, filtering off the sodium sulfate, concentrating the filtrate to about one-half its initial volume, raising the temperature to about 155° C., then adding an excess of concentrated caustic soda solution to form sodium acetate, acidifying the mixture with a solution containing isethionic and sulfuric acids, and separating the resultant acetic acid from the mixture.

5. The process of manufacturing acetic acid, which comprises hydrolyzing carbyl sulfate to form a mixture containing isethionic and sulfuric acids, neutralizing said mixture to form an isethionate and a sulfate, adding an excess of concentrated caustic soda solution to convert the isethionate to sodium acetate, acidifying the resulting mixture to convert the sodium acetate to acetic acid, and separating the resultant acetic acid from the mixture.

6. The process of manufacturing acetic acid, which comprises hydrolyzing carbyl sulfate to produce an acid solution containing isethionic and sulfuric acids, neutralizing said solution, evaporating, cooling and crystallizing from the resultant mixture any sulfates formed, filtering out the sulfates, collecting the filtrate and concentrating it to a desired volume, raising the temperature of the concentrate, adding lime and an excess of caustic solution to form sodium acetate, adding isethionic and sulfuric acids to form a solution containing acetic acid, and separating out the acetic acid.

7. The process of making acetic acid, which comprises hydrolyzing carbyl sulfate with water, cooling it to temper the heat of reaction between the water and the carbyl sulfate, neutralizing the resulting acid solution with caustic soda, crystallizing out the formed sodium sulfate from the formed sodium isethionate in solution, filtering off the liquid portion containing sodium isethionate, concentrating and treating the same with an excess of caustic solution at about 155° C. with constant stirring, reducing the temperature of the mixture to about 120° C., adding an excess of an acid solution to neutralize the caustic added to said mixture and to convert the isethionate to acetic acid, and recovering the acetic acid from the mixture.

8. The process of making acetic acid, which comprises hydrolyzing carbyl sulfate while tempering the heat evolved during the reaction to form isethionic and sulfuric acids, neutralizing said acids with an alkali solution to form a mixture containing isethionate and sulfate, crystallizing and separating the sulfate from the isethionate, concentrating the isethionate solution, raising the temperature on the concentrate, adding an excess of alkali solution with constant stirring, acidifying to form acetic acid, then collecting the acetic acid formed from said mixture.

9. In the process of manufacturing acetic acid which includes the contacting of sulfur trioxide with cracked petroleum vapors containing ethylene in a contact zone to form carbyl sulfate, the steps which comprise passing vapors and gases containing carbyl sulfate from said zone countercurrent to a stream of water to hydrolyze the carbyl sulfate, collecting the resulting isethionic and sulfuric acids formed by said hydrolysis, neutralizing the acids with alkali solution to form a mixture of isethionate and sulfate, adding with constant agitation a small quantity of lime and an excess of a caustic soda solution to form an alkaline solution containing sodium acetate, acidifying the solution, and separating the resulting acetic acid therefrom.

In testimony whereof I affix my signature.
SYLVAN R. MERLEY.
In testimony whereof, I affix my signature.
OTTO SPRING.